United States Patent
Honda

(10) Patent No.: US 10,536,627 B2
(45) Date of Patent: Jan. 14, 2020

(54) DISPLAY APPARATUS, METHOD OF CONTROLLING DISPLAY APPARATUS, DOCUMENT CAMERA, AND METHOD OF CONTROLLING DOCUMENT CAMERA

(71) Applicant: SEIKO EPSON CORPORATION, Tokyo (JP)

(72) Inventor: Yasuhiro Honda, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/560,338

(22) PCT Filed: Mar. 18, 2016

(86) PCT No.: PCT/JP2016/001601
§ 371 (c)(1),
(2) Date: Sep. 21, 2017

(87) PCT Pub. No.: WO2016/157803
PCT Pub. Date: Oct. 6, 2016

(65) Prior Publication Data
US 2018/0077346 A1    Mar. 15, 2018

(30) Foreign Application Priority Data

Mar. 30, 2015 (JP) .................................. 2015-068092

(51) Int. Cl.
*H04N 5/232* (2006.01)
*H04N 9/31* (2006.01)
*H04N 5/268* (2006.01)

(52) U.S. Cl.
CPC ..... *H04N 5/23222* (2013.01); *H04N 5/23203* (2013.01); *H04N 5/23293* (2013.01); *H04N 9/3179* (2013.01); *H04N 5/268* (2013.01)

(58) Field of Classification Search
CPC .......... H04N 5/23222; H04N 5/23293; H04N 9/3179; H04N 5/23206; H04N 9/3194;
(Continued)

(56) References Cited

U.S. PATENT DOCUMENTS 6,239,835 B1    5/2001 Hori
8,239,753 B2 *  8/2012 Shi ........................... G06F 3/00
                                              715/230
(Continued)

FOREIGN PATENT DOCUMENTS

JP    H08-125921 A    5/1996
JP       3491990 B2    2/2004
(Continued)

OTHER PUBLICATIONS

Jun. 7, 2016 Search Report issued in International Patent Application No. PCT/JP2016/001601.

*Primary Examiner* — Padma Haliyur
(74) *Attorney, Agent, or Firm* — Oliff PLC

(57) ABSTRACT

A projector includes: an image I/F unit that communicates with a document camera; a projection unit that displays an image based on photographic image data received from the document camera via the image I/F unit on a screen; a position detection unit that detects a position of an indicator with respect to the screen; and an instruction information transmission unit that transmits a control command for causing the document camera to perform a process based on a function related to an icon via the image I/F unit in a case in which it is detected that a region corresponding to the icon of the screen is operated with the indicator based on a detection result of the position detection unit.

7 Claims, 8 Drawing Sheets

(58) Field of Classification Search
CPC .... H04N 5/23203; H04N 5/268; G03B 21/00; G03B 21/14; G06F 3/0346; G06F 3/0481; G06F 3/0354
See application file for complete search history.

(56) References Cited

U.S. PATENT DOCUMENTS

| | | | |
|---|---|---|---|
| 8,970,886 B2* | 3/2015 | Takabatake | H04N 1/00408 345/156 |
| 2005/0078879 A1 | 4/2005 | Sakurai et al. | |
| 2011/0194155 A1* | 8/2011 | Kasuga | H04N 1/0044 358/448 |
| 2012/0044140 A1* | 2/2012 | Koyama | G06F 3/0325 345/157 |
| 2013/0162607 A1* | 6/2013 | Ichieda | G06F 3/0425 345/204 |

FOREIGN PATENT DOCUMENTS

| | | |
|---|---|---|
| JP | 2005-122323 A | 5/2005 |
| JP | 2005-284874 A | 10/2005 |
| JP | 2007-228038 A | 9/2007 |
| JP | 2007-279144 A | 10/2007 |
| JP | 2013-222280 A | 10/2013 |
| JP | 2014-116881 A | 6/2014 |

* cited by examiner

DISPLAY APPARATUS, METHOD OF CONTROLLING DISPLAY APPARATUS, DOCUMENT CAMERA, AND METHOD OF CONTROLLING DOCUMENT CAMERA

TECHNICAL FIELD

The present invention relates to a display apparatus, a method of controlling the display apparatus, a document camera, and a method of controlling the document camera.

BACKGROUND ART

In the related art, there is known a system in which a document camera transmits image information based on a photographing result of a document placed on a table or a stage to a display apparatus such as a projector and the display apparatus displays an image based on the image information on a display surface such as a screen (for example, see PTL 1). The image displayed on the display surface by the display apparatus is used for a presentation by, for example, a presenter.

CITATION LIST

Patent Literature

PTL 1: JP-A-2014-116881

SUMMARY OF INVENTION

Technical Problem

Here, in the related art, to perform a desired process in a document camera, it is necessary to operate the document camera, for example, by changing a zoom magnification of the document camera or switching between still image photographing and moving image photographing in regard to a photographing method for the document camera, and thus a work is troublesome in some cases. For example, in a case in which an image displayed on a display surface based on a photographing result of a document camera is used for a presentation and a case in which a presenter causes the document camera to perform a desired process, it is necessary for the presenter to move from a position at which the presenter gives the presentation to the position of the document camera and necessary for the presenter to operate the document camera and cause the document camera to perform the predetermined process, and subsequently to perform a work of returning to the position at which the presenter gives the presentation. Thus, the work is troublesome.

The invention is devised in view of the above-described circumstance and an object of the invention is to cause a document camera to easily perform a desired process in the document camera and a display apparatus displaying an image based on a photographing result of the document camera.

Solution to Problem

To achieve the foregoing object, according to an aspect of the invention, there is provided a display apparatus including: a communication unit that communicates with a document camera; a display unit that displays an image based on image information received from the document camera via the communication unit on a display surface; a position detection unit that detects a position of an indicator with respect to the display surface; and an instruction information transmission unit that transmits instruction information for causing the document camera to perform a first process via the communication unit in a case in which it is detected that a first position of the display surface is operated with the indicator based on a detection result of the position detection unit.

In this configuration according to the aspect of the invention, a user can cause the document camera to perform a desired process with a simple work of operating the first position with the indicator without directly operating the document camera.

The display apparatus according to the aspect of the invention further includes an object generation unit that generates an object to be displayed at the first position. The display unit displays the object generated by the object generation unit.

In this configuration according to the aspect of the invention, the user can cause the document camera to perform the desired process with a simple work of operating the object with the indicator using the displayed object.

In the display apparatus according to the aspect of the invention, the object generation unit receives first information from the document camera via the communication unit and generates the object based on the first information.

In this configuration according to the aspect of the invention, the object generation unit can generate the object corresponding to the document camera based on the first information.

In the display apparatus according to the aspect of the invention, the first information is identification information for identifying the document camera. The display apparatus further includes a storage unit that stores the identification information in association with information regarding the object. The object generation unit receives the identification information from the document camera via the communication unit and generates the object based on the information regarding the object stored in association with the identification information in the storage unit.

In this configuration according to the aspect of the invention, the object generation unit can generate the object corresponding to the document camera based on the information associating the identification information with the information regarding the object stored in the storage unit.

The display apparatus according to the aspect of the invention further includes a first input terminal and a second input terminal. The object generation unit generates the object based on the first information received from a second document camera in a case in which the image displayed by the display unit is switched from an image based on image information input via the first input terminal connected to a first document camera to an image based on image information input via the second input terminal connected to the second document camera.

In this configuration according to the aspect of the invention, according to the switch from the image based on the photographing result of the first document camera to the image based on the photographing result of the second document camera, it is possible to match the object to the switched image.

In the display apparatus according to the aspect of the invention, the object generation unit changes a mode of the object in response to a predetermined operation with the indicator.

In this configuration according to the aspect of the invention, the user can change the mode of the object according to a simple method in which the user performs the operation with the indicator.

To achieve the foregoing object, according to another aspect of the invention, there is provided a method of controlling a display apparatus. The method includes: displaying an image based on image information received from a document camera on a display surface; detecting a position of an indicator with respect to the display surface; and transmitting instruction information for causing the document camera to perform a first process in a case in which it is detected that a first position of the display surface is operated based on the detected position of the indicator.

In this configuration according to the aspect of the invention, the user can cause the document camera to perform a desired process with a simple work of operating the first position with the indicator without directly operating the document camera.

To achieve the foregoing object, according to an aspect of the invention, there is provided a document camera including: a communication processing unit that communicates with a display apparatus; an imaging unit that performs photographing; an image output unit that transmits image information based on a photographing result of the imaging unit to the display apparatus via the communication processing unit; and a process control unit that receives instruction information generated by the display apparatus based on an operation of a first position of a display surface by an indicator via the communication control unit and performs a first process based on the received instruction information.

In this configuration according to the aspect of the invention, the user can cause the document camera to perform a desired process with a simple work of operating the first position with the indicator without directly operating the document camera.

The document camera according to the aspect of the invention further includes a determination unit that determines a performable process and transmits information indicating the process determined to be performable to the display apparatus via the communication control unit.

In this configuration according to the aspect of the invention, the document camera can notify the display apparatus of the function of the document camera through the function of the determination unit. The display apparatus can display the object corresponding to the function of the document camera based on the notification.

To achieve the foregoing object, according to still another aspect of the invention, there is provided a method of controlling a document camera. The method includes: performing photographing; transmitting image information based on a photographing result to a display apparatus displaying an image based on the image information on a display surface; and receiving instruction information generated by the display apparatus based on an operation on a first position of the display surface by an indicator and performing a first process based on the received instruction information.

In this configuration according to the aspect of the invention, the user can cause the document camera to perform a desired process with a simple work of operating the first position with the indicator without directly operating the document camera.

DESCRIPTION OF EMBODIMENTS

Figure 1:
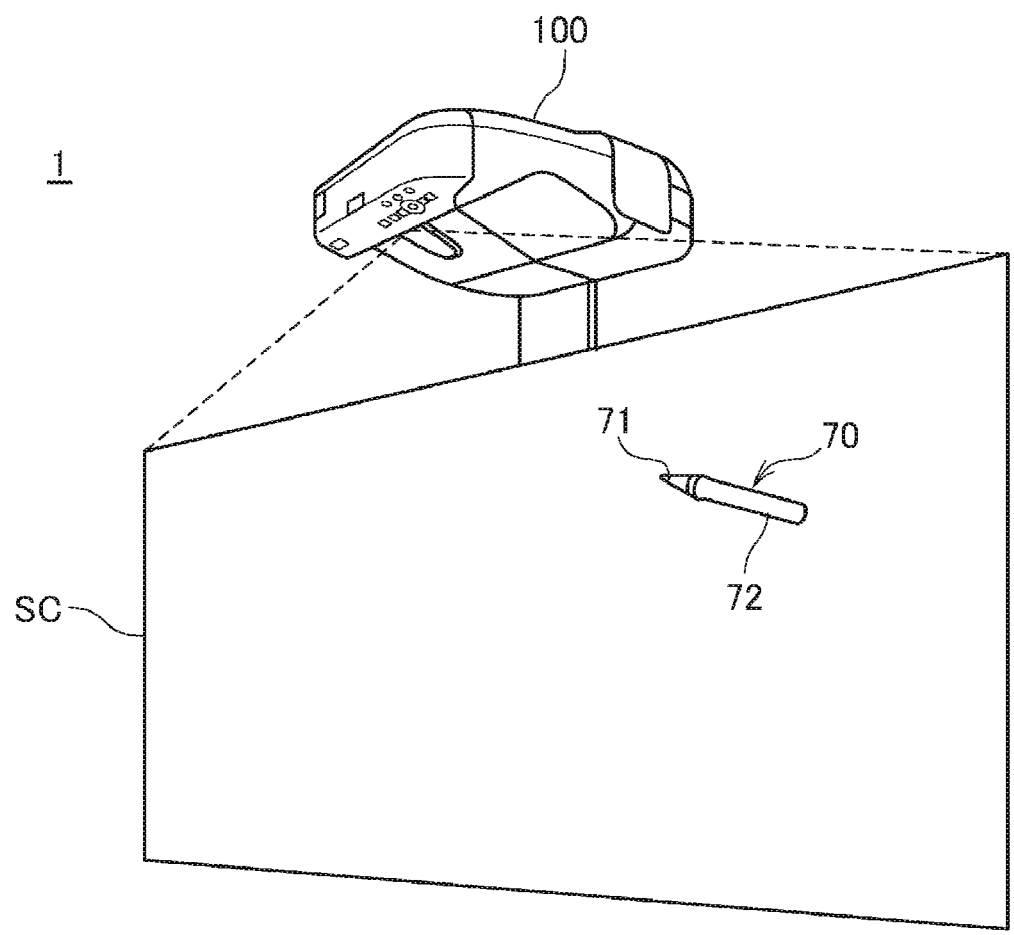
FIG. 1 is a diagram illustrating a configuration and an installation state of a display system.
Figure 1:
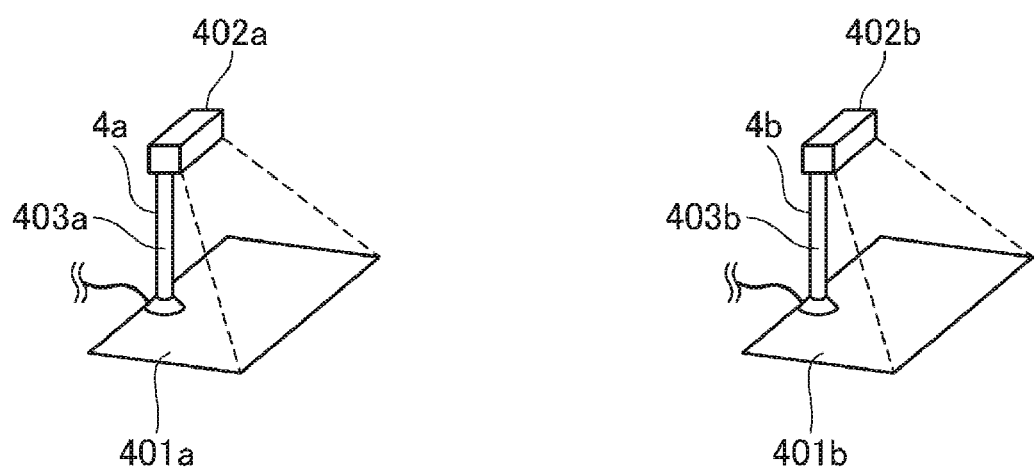

FIG. 1 is a diagram illustrating a configuration and an installation state of a display system 1.

The display system 1 is configured such that two first document camera 4a (a document camera and a first document camera) and second document camera 4b (a document camera and a second document camera) are connected to a projector 100 (a display apparatus) in a wired manner. Hereinafter, in a case in which the first document camera 4a and the second document camera 4b are not distinguished from each other, the first document camera 4a and the second document camera 4b are expressed as "document cameras 4". The number of document cameras 4 connected to the projector 100 is not limited. One document camera 4 may be connected or three or more document cameras 4 may be connected.

The projector 100 is installed above or obliquely above a screen SC (display surface) to project an image toward the screen SC. The screen SC is a plate or a curtain fixed to a wall surface or erect to a surface of a floor. The invention is not limited to this example and the wall surface can also be used as the screen SC. In this case, the projector 100 may be mounted on an upper portion of the wall surface used as the screen SC.

An image supply apparatus such as a personal computer (PC), a video reproduction apparatus, a DVD reproduction apparatus, a Blu-ray (registered trademark) Disc (Blu-ray disc) reproduction apparatus may be connected to the projector 100. In this case, the projector 100 projects an image to the screen SC based on an analog image signal or a digital image data supplied from the image supply apparatus. The projector 100 may read image data stored in an internal storage unit 60 (see FIG. 3) or an externally connected storage medium and may display an image on the screen SC based on the image data.

The projector 100 has a function of detecting a user operation on the screen SC. The user grips a shaft portion 72 of a pen-type indicator 70 with his or her hand and performs an operation on the screen SC using a front end portion 71 of the indicator 70. The operation includes an operation of designating (indicating) a position on the screen SC using the front end portion 71 and an operation of continuously indicating another position on the screen SC. The operation of indicating the position on the screen SC is an operation of bringing the front end portion 71 of the indicator 70 into contact with a predetermined position on the screen SC for a given time. The operation of continuously indicating another position on the screen SC is an operation of moving the front end portion 71 while bringing the front end portion 71 in contact with the screen SC and drawing text or a figure.

The projector 100 detects an operation performed by the user using the indicator 70 and reflects the detected operation in an image on the screen SC. For example, the projector 100 realizes a graphical user interface (GUI) operation of performing a function of the projector 100 based on the coordinates of an operation position indicated by the front end portion 71. The projector 100 has a drawing function of generating text or a figure along a trajectory of an operation position of the front end portion 71 and projecting the generated text or figure to the screen SC.

The first document camera 4a includes a camera head 402a and a support 403a that supports the camera head 402a. The camera head 402a includes an imaging unit 410a (see FIG. 2) that photographs a lower side, photographs a subject placed on a placement surface 401a installed below the camera head 402a, and transmits photographic image data (image information) to the projector 100.

The second document camera 4b includes a camera head 402b corresponding to the camera head 402a, a support 403b corresponding to the support 403a, and a placement surface 401b corresponding to the placement surface 401a.

For example, the display system 1 is used in the following mode in a presentation given by a presenter. That is, the document cameras 4 photograph documents (subjects) on which photos, figures, and other information used for the presentation are printed and transmit photographic image data based on photographing results to the projector 100. The projector 100 projects (displays) an image based on the photographic image data received from the document cameras 4 onto the screen SC. The presenter gives a presentation while complementing a presenter's explanation appropriately using information based on an image by indicating the image projected onto the screen SC. As will be described below, in the display system 1, an image to be displayed on the screen SC can be switched between an image based on the photographing of the first document camera 4a and an image based on the photographing of the second document camera 4b. According to the explanation given by the presenter, the presenter appropriately switches the image to be displayed on the screen SC between the image based on the photographing of the first document camera 4a and an image based on the photographing of the second document camera 4b. During the presentation, the presenter can instruct the first document camera 4a and the second document camera 4b to perform a process based on the function of each document camera 4 in a simple method without interrupting the presentation according to a method to be described below and causes the document cameras to perform the process.

Figure 2:
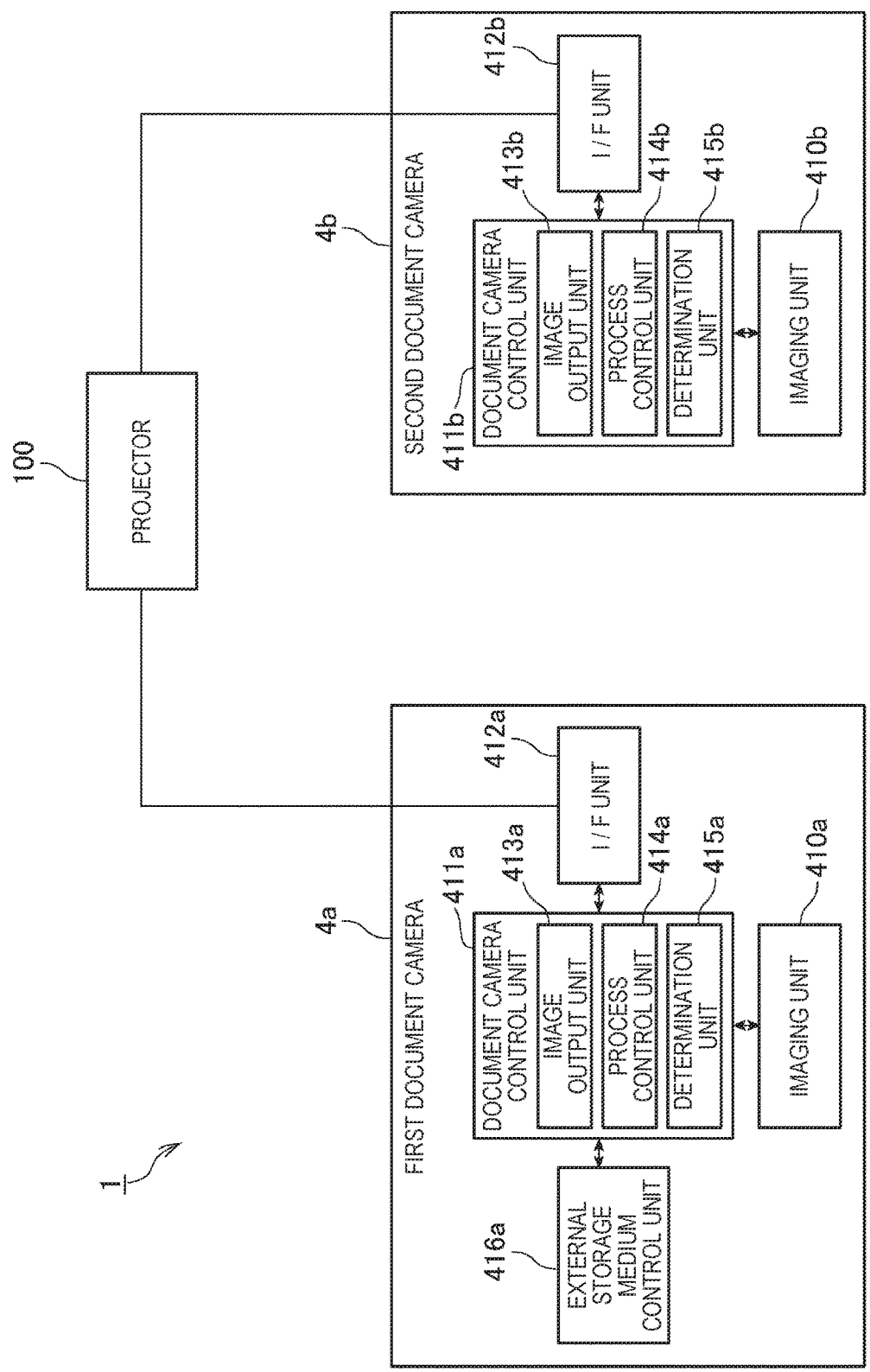
FIG. 2 is a functional block diagram illustrating document cameras.

FIG. 2 is a functional block diagram illustrating a first document camera 4a, a second document camera 4b, and a projector 100.

As illustrated in FIG. 2, the first document camera 4a includes a document camera control unit 411a, an imaging unit 410a, an interface (I/F) unit 412a (a communication processing unit), and an external storage medium control unit 416a.

The document camera control unit 411a includes a CPU, a ROM, a RAM, and a predetermined signal processing circuit and controls each unit of the first document camera 4a.

The document camera control unit 411a includes an image output unit 413a, a process control unit 414a, and a determination unit 415a as functional blocks. The functional blocks perform processes in cooperation with hardware and software, for example, in such a manner that the CPU reads and executes a corresponding control program stored in the ROM. Functions of the functional blocks and processes based on the functions will be described below.

The imaging unit 410a is a digital still camera or a digital video camera and is installed so that the placement surface 401a (see FIG. 1) is included in a photographic range. The imaging unit 410a generates photographic image data (image information) based on a photographing result and outputs the generated photographic image data to the document camera control unit 411a. The image output unit 413a of the document camera control unit 411a transmits the photographic image data to the projector 100 via the interface unit 412a.

The interface unit 412a includes a USB connector performing USB connection to the projector 100 and a circuit including a USB device controller and communicates with the projector 100 according to a USB standard under the control of the document camera control unit 411a.

The interface unit 412a may be an interface corresponding to the High-Definition Multimedia Interface (HDMI) (registered trademark) standard, may be an interface (for example, D-Sub) that outputs a display analog image signal, or may be an interface (for example, DVI) that outputs digital video data. The interface unit 412a may be configured to be connected to the projector 100 and be able to transmit data or may be configured to be connected to the projector 100, for example, by wireless communication.

The external storage medium control unit 416a is configured such that an external storage medium such as an SD memory card or an SDHC memory card can be mounted, writes data on the mounted external storage medium under the control of the document camera control unit 411a, and reads data from the external storage medium.

The first document camera 4a has the following functions.

The first document camera 4a has an autofocus function K1 that automatically performing a focus operation (autofocus) of the imaging unit 410a when a subject placed on the placement surface 401a is photographed.

The first document camera 4a has a document camera freezing function K2 of repeatedly transmitting, at a predetermined period, the photographic image data generated based on the photographing result at the time of receiving a predetermined instruction by a unit to be described below using the predetermined instruction as a trigger. While the document camera freezing function K2 is being performed, the projector 100 continuously displays an image with the same content on the screen SC based on the photographic image data with the same content received from the first document camera 4a at a predetermined period.

The first document camera 4a has a document camera zoom function K3 of changing a zoom magnification of the imaging unit 410a.

The first document camera 4a has a screen 180-degree rotating function K4 of generating data obtained by rotating a direction of an image in the photographic image data at 180 degrees (hereinafter referred to as "reversed image data") based on the photographic image data generated based on the photographing result of the imaging unit 410a and transmitting the generated reversed image data to the projector 100.

The first document camera 4a has a still image photographing function K5 of storing the photographic image data generated based on a photographing result at the time of receiving a predetermined instruction by a unit to be described below using an instruction to perform photographing a still image as a trigger, as a still image file with a predetermined file name in an external storage medium.

The first document camera 4a has a moving image photographing function K6 of cumulatively storing the photographic image data generated at a predetermined period based on a photographing result and a period until reception of an instruction for a unit to be described below to end photographing of a moving image by a unit to be described below using an instruction to start photographing a moving image as a trigger, performing photographing of a moving image to generate a moving image file, and storing the moving image file based on the photographing of the moving image in the external storage medium.

The first document camera 4a has a reproduction screen function K7 of reading files (the still image file and the moving image file) stored in the external storage medium in a predetermined procedure using a predetermined instruction as a trigger by the unit to be described below and transmitting photographic image data based on the read files to the projector 100.

As illustrated in FIG. 2, the second document camera 4b includes a document camera control unit 411b corresponding to the document camera control unit 411a, an imaging unit 410b corresponding to the imaging unit 410a, and an interface unit 412b corresponding to the interface unit 412a. The document camera control unit 411b includes an image output unit 413b corresponding to the image output unit 413a, a process control unit 414b corresponding to the process control unit 414a, and a determination unit 415b corresponding to the determination unit 415a.

On the other hand, the second document camera 4b is different from the first document camera 4a in configuration in that the second document camera 4b does not include a constituent element corresponding to the external storage medium control unit 416a.

The second document camera 4b has the following functions.

The second document camera 4b has the autofocus function K1, the document camera freezing function K2, and the document camera zoom function K3 described above.

On the other hand, the second document camera 4b is different from the first document camera 4a in function in that the second document camera 4b does not have the screen 180-degree rotating function K4, the still image photographing function K5, the moving image photographing function K6, and the reproduction screen function K7 of the first document camera 4a.

Figure 3:
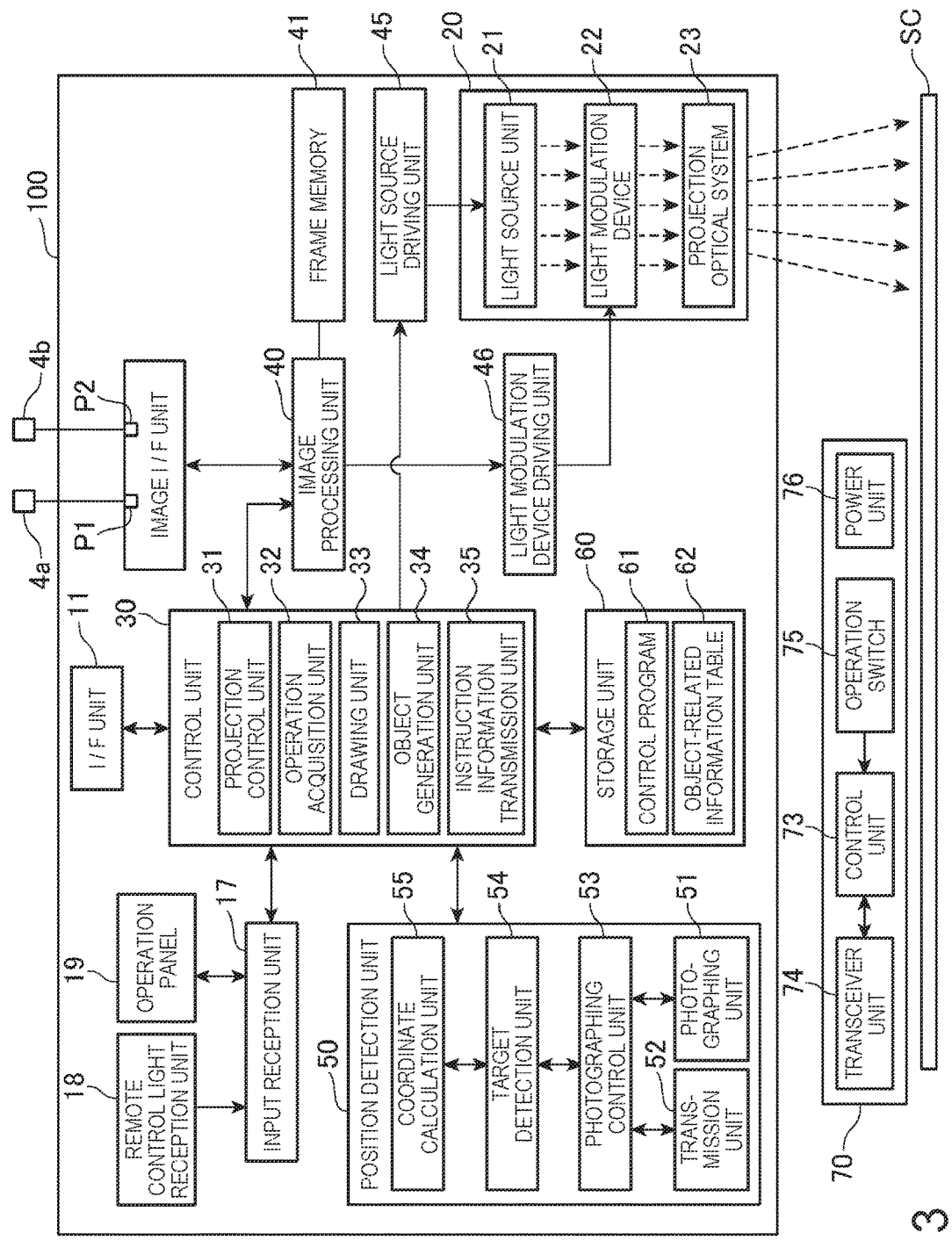
FIG. 3 is a functional block diagram illustrating a projector and an indicator.

FIG. 3 is a functional block diagram illustrating a projector 100.

As illustrated in FIG. 3, the projector 100 includes an interface (I/F) unit 11 and an image interface (I/F) unit 12 (a communication unit) as interfaces connected to external apparatuses.

The image I/F unit 12 includes at least an interface corresponding to a USB standard (a communication standard corresponding to the first document camera 4a and the second document camera 4b according to the embodiment) and communicates with the document cameras 4 under the control of a control unit 30 to be described below.

The I/F unit 11 and the image I/F unit 12 may include connectors for wired connection and include interface circuits corresponding to the connectors. The I/F unit 11 and the image I/F unit 12 may include wireless communication interfaces. Examples of the connectors for wired connection and the interface circuits include connectors conforming to a wired LAN, IEEE 1394, and a USB. Examples of the wireless communication interfaces include interfaces conforming to a wireless LAN and Bluetooth (registered trademark). An interface for image data such as HDMI can be used in the image I/F unit 12. An interface to which an analog image signal of D-Sub or the like is input may be used. The image I/F unit 12 may include an interface to which audio data is input.

The I/F unit 11 is an interface that transmits and receives various kinds of data to and from an external apparatus such as a PC. The I/F unit 11 inputs and outputs data for projection of an image, data for setting an operation of the projector 100, and the like. The control unit 30 to be described below has a function of transmitting and receiving data to and from an external apparatus via the I/F unit 11.

The image I/F unit 12 is an interface to which digital image data is input. The projector 100 according to the embodiment projects an image based on the digital image data input via the image I/F unit 12.

In the embodiment, the image I/F unit 12 includes at least two ports (input terminals), that is, a first USB port P1 (first input terminal) and a second USB port P2 (second input terminal) which are USB ports. The first document camera 4a is connected to the first USB port P1 via a USB cable and photographic image data which is digital image data is input from the first document camera 4a. The second document camera 4b is connected to the second USB port P2 via a USB cable and photographic image data which is digital image data is input from the second document camera 4b.

The projector 100 may have a function of projecting an image based on an analog image signal. In this case, the image I/F unit 12 may include an interface for an analog image and an A/D conversion circuit that converts an analog image signal into digital image data.

The projector 100 includes a projection unit 20 (display unit) that forms an optical image. The projection unit 20 includes a light source unit 21, a light modulation device 22, and a projection optical system 23. The light source unit 21 includes a light source formed of a xenon lamp, an ultra-high pressure mercury lamp, a light emitting diode (LED), or a laser light source. The light source unit 21 may include a reflector and an auxiliary reflector that guides light emitted by the light source to the light modulation device 22. Further, the projector 100 may include a lens group (not illustrated) for improving optical characteristics of projected light, a polarizing plate, or a modulated light element that reduces an amount of light emitted by the light source along a route reaching the light modulation device 22.

The light modulation device 22 includes three transmissive liquid crystal panels corresponding to the three primary colors of RGB and modulates light transmitted through the liquid crystal panels to generate image light. Light from the light source unit 21 is separated into three pieces of color light of RGB and the pieces of color light are incident on the corresponding liquid crystal panels, respectively. The pieces of color light that pass through the liquid crystal panels and are modulated are combined by a combination optical system such as a cross dichroic prism to exit to the projection optical system 23.

The projection optical system 23 includes a lens group that guides the image light modulated by the light modulation device 22 in the direction of the screen SC and forms an image on the screen SC. The projection optical system 23 may include a zoom mechanism that expands or reduces a display image on the screen SC and adjusts a focus or a focus adjustment mechanism that adjusts a focus. In a case in which the projector 100 is of a short focus type, a concave mirror that reflects the image light toward the screen SC may be included in the projection optical system 23.

The projection unit 20 is connected to a light source driving unit 45 that turns on the light source unit 21 under the control of the control unit 30 and a light modulation device driving unit 46 that operates the light modulation device 22 under the control of the control unit 30. The light source driving unit 45 may have a function of adjusting an amount of light of the light source unit 21 by switching turning on and turning off the light source unit 21.

The projector 100 includes an image processing system that processes an image to be projected by the projection unit 20. The image processing system includes the control unit 30 that controls the projector 100, the storage unit 60, an input reception unit 17, an image processing unit 40, the light source driving unit 45, and the light modulation device driving unit 46. A frame memory 41 is connected to the image processing unit 40 and a position detection unit 50 is connected to the control unit 30. These units may be included in the image processing system.

The control unit 30 controls each unit of the projector 100 by executing a predetermined control program 61. The storage unit 60 stores the control program 61 executed by the control unit 30. The storage unit 60 stores an object-related information table 62. The object-related information table 62 will be described below.

The image processing unit 40 processes the image data input via the image I/F unit 12 under the control of the control unit 30 and outputs an image signal to the light modulation device driving unit 46. Processes performed by the image processing unit 40 are a process of discriminating a 3D (stereoscopic) image from a 2D (planar) image, a resolution conversion process, a frame rate conversion process, a distortion correction process, a digital zoom process, a color tone correction process, and a luminance correction process. The image processing unit 40 performs a process designated by the control unit 30 and performs a process using a parameter input from the control unit 30, as necessary. A plurality of processes among the foregoing processes can also be combined to be performed, of course.

The image processing unit 40 is connected to the frame memory 41. The image processing unit 40 loads the image data input from the image input I/F 12 on the frame memory 41 and performs the various processes on the loaded image data. The image processing unit 40 reads the processed image data from the frame memory 41, generates image signals of R, G, and B corresponding to the image data, and outputs the image signals to the light modulation device driving unit 46.

The light modulation device driving unit 46 is connected to the liquid crystal panels of the light modulation device 22. The light modulation device driving unit 46 drives the liquid crystal panels based on the image signals input from the image processing unit 40 and draws an image on each liquid crystal panel.

The input reception unit 17 is connected to a remote control light reception unit 18 and an operation panel 19 functioning as input devices and detects an operation via the remote control light reception unit 18 and the operation panel 19.

The remote control light reception unit 18 receives an infrared signal transmitted in response to a button operation by a remote controller (not illustrated) used by a user of the projector 100. The remote control light reception unit 18 decodes the infrared signal received from the remote controller, generates operation data indicating operation content in the remote controller (remote control), and outputs the operation data to the control unit 30.

The operation panel 19 is installed on an exterior casing of the projector 100 and includes various switches and indicator lamps. The input reception unit 17 appropriately turns on and off the indicator lamps of the operation panel 19 according to an operation state or a setting state of the projector 100 under the control of the control unit 30. When a switch of the operation panel 19 is operated, operation data corresponding to the operated switch is output from the input reception unit 17 to the control unit 30.

The position detection unit 50 detects an operation position with the indicator 70. The position detection unit includes units, that is, a photographing unit 51, a transmission unit 52, a photographing control unit 53, a target detection unit 54, and a coordinate calculation unit 55.

The photographing unit 51 forms a photographic image obtained by photographing a range including the screen SC and its periphery as a photographic range. The photographing unit 51 includes an infrared image sensor photographing infrared light and an interface circuit and performs photographing using the infrared light. As the image sensor, one of a CCD and a CMOS can be used or another element can also be used. A photographic direction and a photographic range (angle of view) of the photographing unit 51 covers a range in which the projection optical system 23 projects an image onto the screen SC in the same direction or substantially the same direction as the projection optical system 23. The photographing unit 51 outputs photographic image data.

The photographing control unit 53 controls the photographing unit 51 such that the photographing unit 51 performs photographing under the control of the control unit 30. The photographing control unit 53 acquires the photographic image data of the photographing unit 51 and outputs the photographic image data to the target detection unit 54. An image of infrared light emitted by the indicator 70 is shown in the photographic image data photographed with the infrared light by the photographing unit 51.

The transmission unit 52 transmits an infrared signal to the indicator 70 under the control of the photographing control unit 53. The transmission unit 52 includes a light source such as an infrared LED and turns on and off the light source under the control of the photographing control unit 53.

The target detection unit 54 detects the image of the infrared light shown in the photographic image data of the photographing unit 51 and detects the coordinates of an operation position of the indicator 70 in the photographic image data. The target detection unit 54 determines whether the front end portion 71 of the indicator 70 comes into contact with the screen SC and generates touch information indicating whether the front end portion 71 comes into contact with the screen SC. A method of determining whether the front end portion 71 of the indicator 70 comes into contact with the screen SC will be described below.

The coordinates of the operation position of the indicator 70 detected by the target detection unit 54 are coordinates in the photographic image data of the photographing unit 51.

The coordinate calculation unit 55 converts the coordinates of the operation position into coordinates of an operation position on the screen SC. In the embodiment, the coordinates of the operation position are converted into coordinates in a projected image projected by the projection unit 20. The coordinates in the projected image are affected by various components such as a distance between the projector 100 and the screen SC, a zoom magnification in the projection optical system 23, an installation angle of the projector 100, and a distance between the photographing unit 51 and the screen SC. The coordinate calculation unit 55 calculates the coordinates of an operation position in a display image on the screen SC from the coordinates of the operation position in the photographic image data based on a result of calibration performed beforehand. In the calibration, a predetermined pattern image is projected from the projection unit 20 to the screen SC and the displayed pattern image is photographed by the photographing unit 51. A correspondence relation (coordinate conversion parameter) between the coordinates in the photographic image data and the coordinates in the display image on the screen SC is guided based on the pattern image photographed by the photographing unit 51. The control unit 30 can specify an operation position in the projected image drawn by the frame memory 41 based on the coordinates of the operation position in the projected image.

The indicator 70 includes a control unit 73, a transceiver unit 74, an operation switch 75, and a power unit 76. These units are accommodated in the shaft portion 72 (see FIG. 1). The control unit 73 is connected to the transceiver unit 74 and the operation switch 75 and detects an ON/OFF state of the operation switch 75. The transceiver unit 74 includes a light source such as an infrared LED and a light reception element that receives infrared light, turns on and off the light source under the control unit 73, and outputs a signal indicating a light reception state of the light reception element to the control unit 73.

The power unit 76 includes a battery or a secondary cell as a power source and supplies power to the units, that is, the control unit 73, the transceiver unit 74, and the operation switch 75. The indicator 70 may include a power switch that turns on/off power supply from the power unit 76.

A method of specifying an operation position of the indicator 70 from photographic image data of the photographing unit 51 through mutual communication of the position detection unit 50 and the indicator 70 will be described.

In a case in which an operation is detected with the indicator 70, the control unit 30 controls the photographing control unit 53 and causes the transmission unit 52 to transmit a synchronization signal. That is, the photographing control unit 53 turns on the light source of the transmission unit 52 at a predetermined period under the control of the control unit 30. The infrared light periodically emitted by the transmission unit 52 functions as a synchronization signal for synchronizing the position detection unit 50 and the indicator 70.

On the other hand, the control unit 73 starts supplying power from the power unit 76 and performs a predetermined initialization operation, and subsequently causes the transceiver unit 74 to receive the infrared light emitted by the transmission unit 52 of the projector 100. When the transceiver unit 74 receives the infrared light periodically emitted by the transmission unit 52, the control unit 73 causes the preset indicator 70 to turn on (emits light) the light source of the transceiver unit 74 in a unique lighting pattern in synchronization with a timing of the infrared light. The control unit 73 switches a lighting pattern of the transceiver unit 74 according to an operation state of the operation switch 75. Therefore, the target detection unit 54 of the projector 100 can determine an operation state of the indicator 70, that is, whether the front end portion 71 is pressed against the screen SC, based on a plurality of pieces of photographic image data.

The control unit 73 repeatedly performs the foregoing pattern while power is supplied from the power unit 76. That is, the transmission unit 52 periodically transmits the synchronization infrared signal to the indicator 70. The indicator 70 transmits a preset infrared signal in synchronization with the infrared signal transmitted by the transmission unit 52.

The photographing control unit 53 performs control such that a photographic timing by the photographing unit 51 matches a timing at which the indicator 70 is turned on. The photographic timing is decided based on a timing at which the photographing control unit 53 turns on the transmission unit 52. The target detection unit 54 can specify a pattern in which the indicator 70 is turned on according to whether the image of the light of the indicator 70 is shown in the photographic image data of the photographing unit 51. The target detection unit 54 determines whether the front end portion 71 of the indicator 70 is pressed against the screen SC based on the plurality of pieces of photographic image data and generates touch information.

The lighting pattern of the indicator 70 can include a pattern unique for each entity of the indicator 70 or a common pattern to the plurality of indicators 70 and a pattern unique to each entity. In this case, the target detection unit 54 can distinguish each image as images of the different indicators 70 in a case in which the image of the infrared light emitted by the plurality of indicators 70 is included in the photographic image data.

The control unit 30 realizes functions of a projection control unit 31, an operation acquisition unit 32, a drawing unit 33, an object generation unit 34, and an instruction information transmission unit 35 by reading and executing the control program 61 stored in the storage unit 60, and controls each unit of the projector 100.

The projection control unit 31 acquires operation content formed through a user operation on the remote controller based on the operation data input from the input reception unit 17. The projection control unit 31 controls the image processing unit 40, the light source driving unit 45, the light modulation device driving unit 46 according to an operation performed by the user and projects an image onto the screen SC.

The projection control unit 31 controls the image processing unit 40 such that the image processing unit 40 performs the process of discriminating a 3D (stereoscopic) image from a 2D (planar) image, the resolution conversion process, the frame rate conversion process, the distortion correction process, the digital zoom process, the color tone correction process, and the luminance correction process described above. The projection control unit 31 controls the light source driving unit 45 in conformity to the process of the image processing unit 40 to control the amount of light of the light source unit 21.

The operation acquisition unit 32 acquires an operation position of the indicator 70 detected by the position detection unit 50. In a case in which the position detection unit 50 detects the operation position of the indicator 70 in a state in which a GUI operation image such as a menu bar is displayed on the screen SC, the operation acquisition unit 32 specifies an image corresponding to the operation position and detects instruction content. For example, in the state in which the menu bar is displayed, an icon corresponding to the operation position of the indicator 70 in the menu bar is specified and a function of the specified icon is detected.

The drawing unit 33 draws text or a figure according to the operation position of the indicator 70 detected by the position detection unit 50. In a case in which the operation acquisition unit 32 detects an operation of giving an instruction of drawing, the drawing unit 33 acquires a trajectory of the operation position of the indicator 70 and generates an image of a figure such as a polygon, a straight line, or a curved line along the trajectory. A kind of the figure or the image generated by the drawing unit 33 is designated through an operation detected by the operation acquisition unit 32. The image generated by the drawing unit 33 is transmitted to the image processing unit 40. The image processing unit 40 combines a drawn image on the image on the frame memory 41 under the control of the projection control unit 31. Thus, the image drawn by the drawing unit 33 is projected by the projection unit 20.

Functions of the object generation unit 34 and the instruction information transmission unit 35 and processes based on the functions will be described below.

As described above, the document camera 4 can be connected to the projector 100 according to the embodiment.

Hereinafter, an operation of the projector 100 at the time of supplying power and the time of connection of the document camera 4 to the projector 100 will be described.

Figures 4A, 4B:
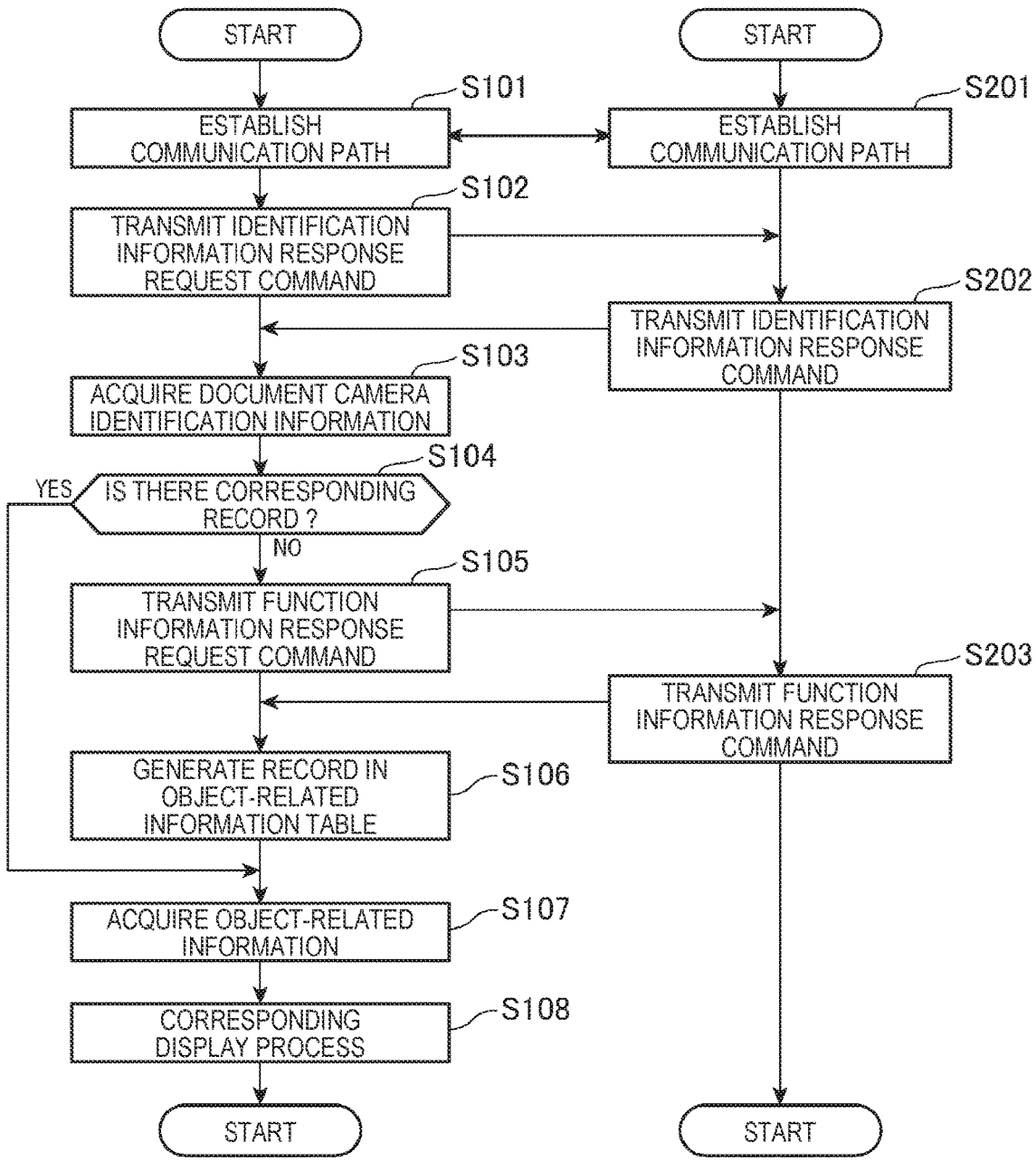
FIGS. 4A and 4b are flowcharts illustrating operations of the projector and the document camera.

FIG. 4 is a flowchart illustrating operations of the projector 100 and the first document camera 4a at the time of supplying power to the projector 100 and the time of connection of the first document camera 4a to the projector 100. A flowchart of FIG. 4(A) illustrates an operation of the projector 100 and the flowchart of FIG. 4(B) illustrates an operation of the first document camera 4a.

A process of the flowchart of FIG. 4 is performed using the following as a trigger. That is, the process of the flowchart of FIG. 4 is performed using supply of power to the projector 100 in a state in which the first document camera 4a is physically connected to a USB port (in this example, the first USB port P1) of the projector 100 via the USB cable, as a trigger. In this case, the control unit 30 of the projector 100 detects that the first document camera 4a is physically connected according to a USB standard as an initial process performed with the supply of the power. The process of the flowchart of FIG. 4 is performed using physical connection of the first document camera 4a to the projector 100 after the supply of the power as a trigger. In this case, the control unit 30 of the projector 100 detects that the first document camera 4a is physically connected according to the USB standard.

As illustrated in FIGS. 4(A) and 4(B), the image I/F unit 12 of the projector 100 and the interface unit 412a of the first document camera 4a communicate with each other in conformity to the USB standard to establish a communication path and enter a bidirectional communicable state in conformity to the USB standard between the apparatuses (steps S101 and S201).

As illustrated in FIG. 4(A), after the communication path is established, the control unit 30 of the projector 100 controls the image I/F unit 12 and transmits an identification information response request command for requesting a response of document camera identification information (identification information) to the first document camera 4a (step S102).

The document camera identification information is information for uniquely identifying the document camera 4. For example, when the document camera 4 is manufactured, a serial number allocated to the document camera 4 can be used as document camera identification information.

When the communication path is established, the document camera identification information received from the document camera 4 with which the communication path is established by the projector 100 is equivalent to "first information".

As illustrated in FIG. 4(B), the document camera control unit 411a of the first document camera 4a controls the interface unit 412a, receives the identification information response request command, and transmits an identification information response command to respond to the document camera identification information of the first document camera 4a based on the command (step S202).

As illustrated in FIG. 4(A), the control unit 30 of the projector 100 controls the image I/F unit 12, receives the identification information response command, and acquires the document camera identification information based on the command (step S103).

In the embodiment, the control unit 30 requests a response to the document camera identification information to the first document camera 4a and acquires the document camera identification information based on the response to the request. However, when the first document camera 4a functions with a USB device to the projector 100 and the first document camera 4a establishes the communication path with the projector 100, the first document camera 4a transmits a vendor ID and a product ID uniquely allocated to the USB device to the projector 100 in conformity to the USB standard. Based on the above, the vendor ID and the product ID of the first document camera 4a can also be used as the document camera identification information. In other words, without performing step S102 in which the control unit 30 requests the response to the document camera identification information to the document camera 4a, the document camera identification information may be transmitted from the side of the first document camera 4a.

Subsequently, the control unit 30 determines whether there is a record including the document camera identification information acquired in step S103 in the object-related information table 62 with reference to the object-related information table 62 stored in the storage unit 60 (step S104).

Here, as will be clear below, in a case in which the document camera 4 (in this example, the first document camera 4a) establishing the communication path in step S101 is previously connected to the projector 100, there is the record including the document camera identification information of the document camera 4 in the object-related information table 62 in this state. Conversely, in a case in which the document camera 4 (in this example, the first document camera 4a) establishing the communication path in step S101 is not previously connected to the projector 100 and is connected to the projector 100 for the first time, there is no record including the document camera identification information of the document camera 4 in the object-related information table 62 in this state. Accordingly, in a case in which the document camera 4 is previously connected to the projector 100 in step S104, the control unit 30 determines that there is the record including the document camera identification information acquired in step S103 in the object-related information table 62. Conversely, in a case in which the document camera 4 is not previously connected to the projector 100 in step S104, the control unit 30 determines that there is no record including the document camera identification information acquired in step S103 in the object-related information table 62.

In the case in which the control unit 30 determines that there is the record including the document camera identification information acquired in step S103 in the object-related information table 62 (YES in step S104), the control unit 30 causes the process procedure to proceed to step S107 to be described below.

In the case in which the control unit 30 determines that there is no record including the document camera identification information acquired in step S103 in the object-related information table 62 (NO in step S104), the control unit 30 performs the following process (step S105). That is, the control unit 30 controls the image I/F unit 12 to transmit a function information response request command for requesting response to identification information regarding a function (hereinafter referred to as "function identification information") of the first document camera 4a to the first document camera 4a (step S105).

As illustrated in FIG. 4(B), the determination unit 415a of the document camera control unit 411a of the first document camera 4a controls the interface unit 412a, receives the function information response request command, and transmits a function information response command responding to the function identification information of the function of the first document camera 4a based on this command (step S203).

More specifically, in step S203, the determination unit 415a determines the function of the first document camera 4a. For example, data including information indicating the function of the first document camera 4a is stored in a predetermined storage region of the first document camera 4a in advance and the determination unit 415a determines the function of the first document camera 4a based on the data. For example, when the function of the first document camera 4a can be determined with predetermined information such as information indicating a version or a model (model number) of the control program 61, the determination unit 415a acquires the predetermined information and determines the function of the first document camera 4a based on the predetermined information. Subsequently, the determination unit 415a generates a function information response command including function identification information of the determined function of the first document camera 4a. Subsequently, the determination unit 415a transmits the generated function information response command.

As described above, the first document camera 4a has the autofocus function K1, the document camera freezing function K2, the document camera zoom function K3, the screen 180-degree rotating function K4, the still image photographing function K5, the moving image photographing function K6, and the reproduction screen function K7. Accordingly, in step S203, the determination unit 415a generates and transmits the function information response command including the function identification information of the seven functions.

The function of the document camera 4 is equivalent to a "process which can be performed by the document camera 4".

As illustrated in FIG. 4(A), the control unit 30 of the projector 100 controls the image I/F unit 12, receives the function information response command, and generates one record in the object-related information table 62 based on the command (step S106).

Figures 5A, 5B:
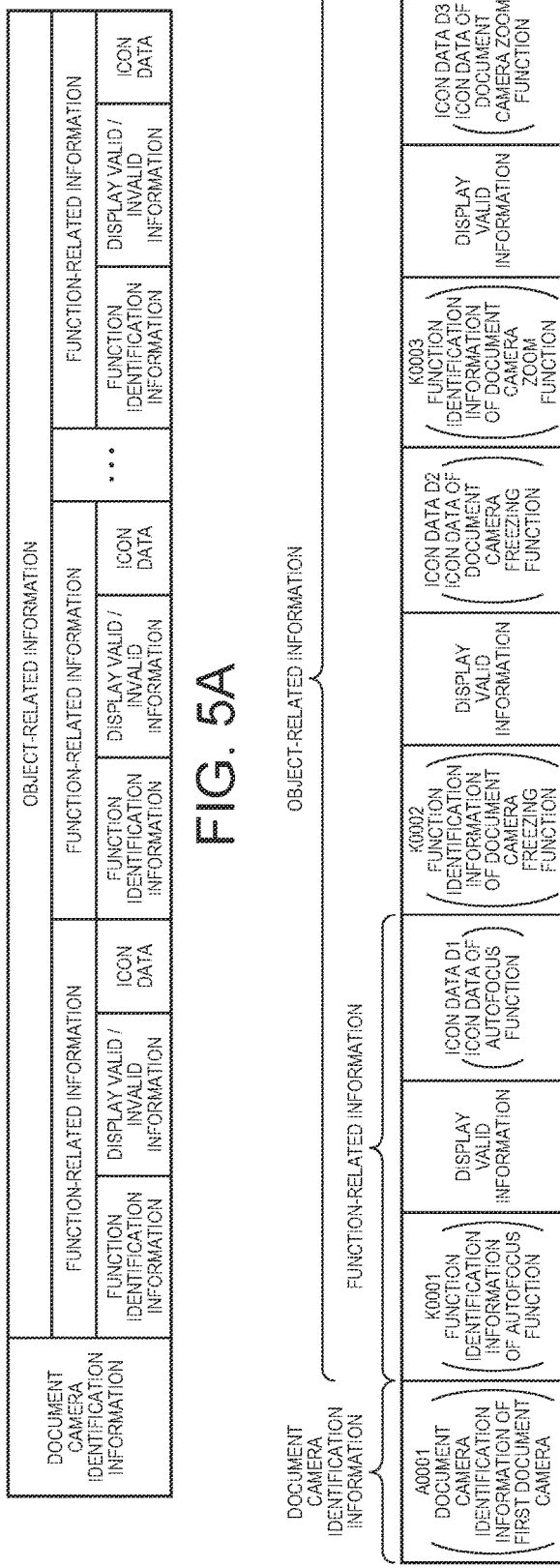
FIGS. 5A and 5B are diagrams illustrating content of a record of an object-related table.

FIG. 5(A) is a diagram schematically illustrating a data structure of a record included in the object-related information table 62.

As illustrated in FIG. 5(A), one record of the object-related information table 62 has document camera identification information and object-related information. The object-related information includes one piece of or a plurality of pieces of function-related information. The function-related information includes function identification information, display valid/invalid information, and icon data.

The object-related information is equivalent to "information regarding an object".

The display valid/invalid information will be described in detail below. In a case in which the document camera toolbox (which will be described below) is displayed based on a corresponding record, the display valid/invalid information is information indicating whether an icon of a corresponding function is displayed in the document camera toolbox. The display valid/invalid information takes one value of display valid information indicating that an icon of a corresponding function is displayed in the document camera toolbox or display invalid information indicating that an icon of a corresponding function is not displayed in the document camera toolbox.

The icon data is image data of the icon of the corresponding function.

In step S106, the control unit 30 acquires the function identification information (each of the plurality of pieces of function identification information in a case in which the plurality of pieces of function identification information are included) included in a function information response command received from the first document camera 4a. Subsequently, the control unit 30 generates the function-related information configured by combining the function identification information, the display valid information which is a default value of display valid/invalid information, and the corresponding icon data in each piece of acquired function identification information. The storage unit 60 stores a table in which the function identification information and the icon data are associated in advance in each function of the document camera 4 which can be connected to the projector 100. The control unit 30 acquires the corresponding icon data in each piece of function identification information based on the table. The icon data may be stored by the document camera 4 and the control unit 30 may be configured to communicate with the document camera 4 and acquire the icon data from the document camera 4.

Subsequently, the control unit 30 generates the object-related information configured by combining the pieces of generated function-related information.

Subsequently, the control unit 30 generates one record in which the generated object-related information and the document camera identification information acquired in step S103 are associated in the object-related information table 62.

FIG. 5(B) is a diagram schematically illustrating content of a record generated by the control unit 30 based on a model information response command received from the first document camera 4a.

As illustrated in FIG. 5(B), a record related to the first document camera 4a has document camera identification information of the first document camera 4a and object-related information related to the first document camera 4a. The object-related information has the function-related information corresponding to each function of the first document camera 4a. The function-related information includes the function identification information of the corresponding function, the display valid information (the default value of the display valid/invalid information), and the corresponding icon data.

Here, the storage unit 60 storing the object-related information table 62 includes a nonvolatile memory and stores data in a nonvolatile manner. Accordingly, the object-related information table 62 is continuously stored in the storage unit 60 even in a case in which the projector 100 is powered off.

After the process of step S106 is performed, the control unit 30 causes the process procedure to proceed to step S107.

In step S107, the control unit 30 specifies a record including the document camera identification information acquired in step S103 from the records of the table with reference to the object-related information table 62 and acquires the object-related information included in the specified record. In step S107, the object-related information acquired by the control unit 30 is object-related information related to the document camera 4 (in this example, the first document camera 4a) establishing the communication path in step S101.

Subsequently, the control unit 30 performs a corresponding display process (step S108). The corresponding display process differs in content of a process between a case (Case 1) in which there is no document camera 4 connected to the projector 100 other than the document camera 4 establishing the communication path in step S101 and a case (Case 2) in which the document camera 4 (hereinafter referred to as "another document camera 4") is already connected to the projector 100 other than the document camera 4 establishing the communication path in step S101, and an image based on an input from another document camera 4 and a document camera control toolbox corresponding to the document camera 4 are displayed on the screen SC.

Hereinafter, the corresponding display process will be described separately in Cases 1 and 2.

<Case 1>

In Case 1, the control unit 30 validates an input from a USB port (input terminal) connected to the document camera 4 establishing the communication path in step S101 and enters a state in which the photographic image data input via the USB port is output to the image processing unit 40. In response to the entering to the state, display of the image based on the photographic image data input via the validated USB port on the screen SC is started.

The object generation unit 34 of the control unit 30 generates image data of the document camera control toolbox (object) based on the object-related information acquired in step S107. Subsequently, the object generation unit 34 controls the image processing unit 40 based on the generated image data of the document camera control toolbox, processes the photographic image data input from the image I/F unit 12 to the image processing unit 40 and loaded on the frame memory 41, and displays the document camera control toolbox at a predetermined position on the screen SC. Hereinafter, the display of the document camera control toolbox on the screen SC will be described in detail.

Figure 6A:
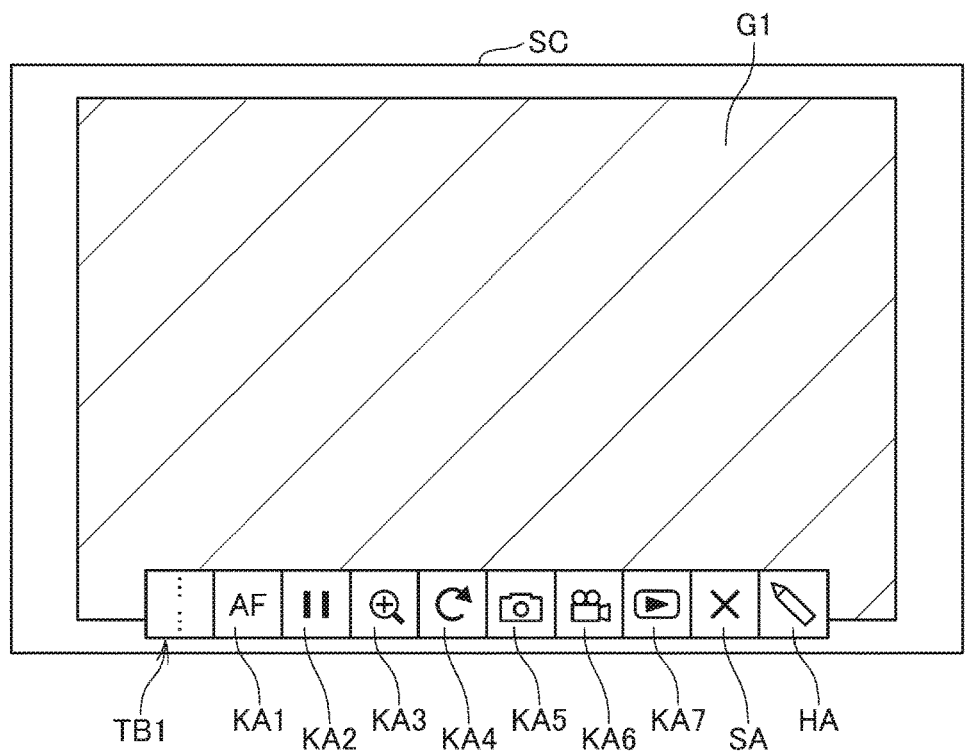
FIGS. 6A and 6B are diagrams illustrating a document camera control toolbox.

FIG. 6(A) is a diagram illustrating an example of a first document camera control toolbox TB1 which is a control document camera control toolbox of the first document camera 4a displayed on the screen SC in the process of step S108 and an image G1 which is an image based on the photographic image data input from the first document camera 4a.

The document camera control toolbox is a GUI that includes an icon or a plurality of icons. Each icon can be operated with the indicator 70.

As illustrated in FIG. 6(A), the first document camera control toolbox TB1 includes a plurality (seven in the example of FIG. 6(A)) of function icons KA (function icons KA1 to KA7), a deletion icon SA, and an edit icon HA.

In FIG. 6(A), the function icon KA1 is an icon indicating the autofocus function K1. The function icon KA2 is an icon indicating the document camera freezing function K2. The function icon KA3 is an icon indicating the document camera zoom function K3. The function icon KA4 is an icon indicating the screen 180-degree rotating function K4. The function icon KA5 is an icon indicating the still image photographing function K5. The function icon KA6 is an icon indicating the moving image photographing function K6. The function icon KA7 is an icon indicating the reproduction screen function K7.

An operation example of the projector 100 and the document camera 4 in a case in which the function icons KA are operated with the indicator 70 will be described.

The deletion icon SA is an icon which is operated in a case in which the first document camera control toolbox TB1 is deleted from the screen SC.

The edit icon HA is an icon which is operated in a case in which content of the first document camera control toolbox TB1 is edited. A process of the control unit 30 in a case in which the edit icon HA is operated will be described below.

In Case 1, in step S108, the object generation unit 34 of the control unit 30 specifies function identification information associated with the display valid information in the object-related information acquired in step S107. Subsequently, the object generation unit 34 acquires icon data associated with the specified function identification information. Subsequently, the object generation unit 34 generates image data of the first document camera control toolbox TB1 in which the function icons KA are arranged in a predetermined order and the deletion icon SA and the edit icon HA are continuously arranged based on the acquired icon data. The image data of the deletion icon SA and the edit icon HA is stored in a predetermined storage region in advance.

Subsequently, the object generation unit 34 controls the image processing unit 40 based on the generated image data of the first document camera control toolbox TB1, processes the image data (the photographic image data) input from the image I/F unit 12 to the image processing unit 40 and loaded on the frame memory 41, and displays the document camera control toolbox at a predetermined position on the screen SC. In the frame memory 41, the control unit 30 manages the coordinates of the region on which the image data of the icons included in the first document camera control toolbox TB1 is loaded. Thus, in a case in which the user operates any of the icons included in the first document camera control toolbox TB1 is operated with the indicator 70, the control unit 30 can specify the operated icon based on an operation position of the indicator 70 acquired by the operation acquisition unit 32.

<Case 2>

In Case 2, the control unit 30 continuously displays an image based on the photographic image data input from another document camera 4 and already displayed without switching the USB port in which an input is validated. The control unit 30 continuously displays the document camera control toolbox related to the document camera 4.

On the other hand, the control unit 30 displays a switching icon CA at a predetermined position on the screen SC without performing display of the document camera control toolbox related to the document camera 4 (in this example, the first document camera 4a) establishing the communication path in step S101.

Figure 6B:
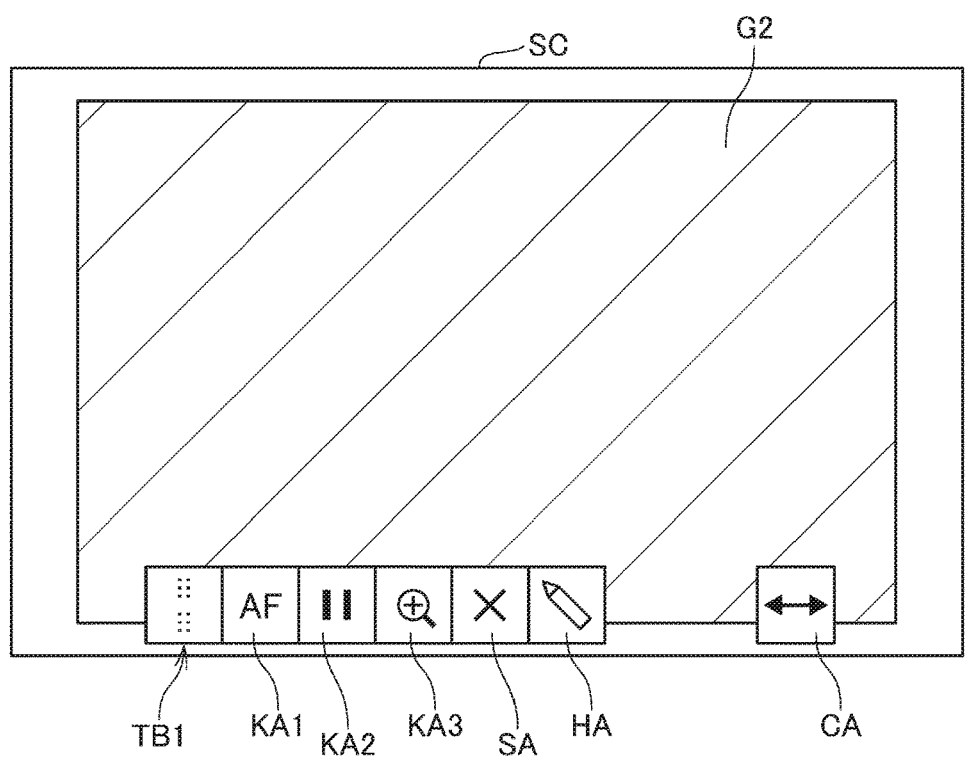

FIG. 6(B) is a diagram illustrating a second document camera control toolbox TB2 which is a document camera control toolbox related to the second document camera 4b and the switching icon CA displayed on the screen SC along with an image G2 based on a photographing result of the second document camera 4b in a case in which another document camera is the second document camera 4b in Case 2.

The image data related to the switching icon CA is stored in advance in a predetermined storage region. In step S108, the control unit 30 processes image data (photographic image data) input from the image I/F unit 12 to the image processing unit 40 and loaded on the frame memory 41 based on the image data of the switching icon CA and displays the switching icon CA at a predetermined position on the screen SC. The control unit 30 manages the coordinates of the region on which the image data of the switching icon CA is loaded in the frame memory 41. Thus, in a case in which the user operates the switching icon CA with the indicator 70, the control unit 30 can detect that the switching icon CA is operated based on an operation position of the indicator 70 acquired by the operation acquisition unit 32.

In a case in which it is detected that the switching icon CA is operated with the indicator 70, the control unit 30 performs the following process. That is, the control unit 30 switches an input terminal in which an input of the image displayed on the screen SC is validated from one input terminal to another input terminal. Thus, the image displayed on the screen SC is switched from an image based on the photographic image data input from the document camera 4 connected to one input terminal to an image based on the photographic image data input from the document camera 4 connected to another input terminal. The control unit 30 stops displaying the document camera control toolbox related to the document camera 4 connected to one input terminal in which an input is considered to be invalidated by switching. When a communication path with the document camera 4 connected to another input terminal in which an input is considered to be validated by switching is established, the object generation unit 34 acquires object-related information corresponding to the object-related table based on the document camera identification information received from the document camera 4, generates image data of the document camera control toolbox related to the document camera 4 based on the acquired object-related information, and displays the document camera control toolbox based on the generated image data. The control unit 30 continuously displays the switching icon CA.

For example, in a case in which the first document camera 4a is connected to the first USB port P1, the second document camera 4b is connected to the second USB port P2, and an input of the first USB port P1 is validated and a case in which it is detected that the switching icon CA is operated, the control unit 30 performs the following process.

That is, the control unit 30 switches the USB port in which the input is validated from the first USB port P1 to the second USB port P2. According to this switching, an image displayed on the screen SC is switched from an image based on the photographic image data input from the first document camera 4a to an image based on the photographic image data input from the second document camera 4b. Subsequently, the control unit 30 stops displaying the first document camera control toolbox TB1 related to the first document camera 4a. Subsequently, when a communication path with the second document camera 4b is established, the object generation unit 34 of the control unit 30 acquires object-related information corresponding to the object-related table based on the document camera identification information received from the second document camera 4b. Subsequently, the object generation unit 34 generates the image data of the second document camera control toolbox TB2 related to the second document camera 4b based on the acquired object-related information and displays the second document camera control toolbox TB2 based on the generated image data.

Next, a process of the control unit 30 in a case in which it is detected that the edit icon HA is operated with the indicator 70 will be described.

In a case in which it is detected that the edit icon HA is operated with the indicator 70, the control unit 30 displays an edit screen HG on the screen SC.

Figure 7:
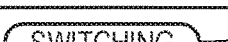
FIG. 7 is a diagram illustrating an edit screen.

FIG. 7 is a diagram illustrating an example of the edit screen HG displayed on the screen SC.

As illustrated in FIG. 7, the edit screen HG displays a list of names of functions (hereinafter referred to as "function names") in regard to the functions of the corresponding document camera 4 (the document camera 4 related to the document camera control toolbox including the operated edit icon HA). Further, the edit screen HG displays information indicating whether display of the function icon KA of a corresponding function is valid or invalid and valid/invalid switching button BB (which will be described below) in association with each of the function names displayed in the list.

Validation of the display of the function icon KA related to one function means that the function icon KA related to the one function is included in the toolbox in a case in which the document camera control toolbox is displayed. Invalidation of the display of the function icon KA related to one function means that the function icon KA related to the one function is not included in the toolbox in a case in which the document camera control toolbox is displayed.

When the edit screen HG is displayed, the control unit 30 acquires the object-related information of the corresponding document camera 4 from the object-related information table 62 according to the above-described method. Subsequently, the control unit 30 acquires the function identification information of the function of the corresponding document camera 4 based on the function-related information included in the object-related information. Here, a table in which the function identification information and the function name are associated with each of the functions which the document camera 4 connectable to the projector 100 has is stored in a predetermined storage region in advance. The control unit 30 acquires the function name corresponding to each piece of acquired function identification information based on the table. Subsequently, the control unit 30 acquires display valid/invalid information of the function of the corresponding document camera 4 based on the object-related information. Subsequently, the control unit 30 generates image data of the edit screen HG based on the acquired function name and the display valid/invalid information. Subsequently, the control unit 30 displays the edit screen HG on the screen SC based on the generated image data of the edit screen HG.

In the edit screen HG, a valid/invalid switching button BB is a button which can be operated with the indicator 70. In a case in which it is detected that one valid/invalid switching button BB is operated with the indicator 70, the control unit 30 updates a value of corresponding display valid/invalid information included in the object-related information of a corresponding record in the object-related information table 62 from the display valid information to the display invalid information or from the display invalid information to the display valid information. As a result, in a case in which the value of the display valid/invalid information is updated from the display valid information to the display invalid information, a state in which the function icon KA corresponding to the document camera control toolbox displayed based on the object-related information is displayed is changed to a state in which the function icon KA is not displayed. Conversely, in a case in which the value of the display valid/invalid information is updated from the display invalid information to the display valid information, the state in which the function icon KA corresponding to the document camera control toolbox displayed based on the object-related information is not displayed is changed to the state in which the function icon KA is displayed.

Here, in a case in which the display valid/invalid information of the object-related information is updated using the edit screen HG, updated object-related information is stored in a nonvolatile manner in the object-related information table 62. Therefore, in a case in which the document camera control toolbox related to one document camera 4 is displayed using a predetermined event such as a power input of the projector 100, connection of the document camera 4 to the projector 100, or an operation on the switching icon CA as a trigger, the toolbox is displayed based on the updated object-related information. Accordingly, in a case in which the user deletes the function icon KA related to one function of one document camera 4 from the document camera control toolbox using the edit screen HG, the function icon KA related to the one function is not subsequently displayed in the document camera control toolbox of the one document camera 4 displayed using the predetermined even as the trigger. That is, the user can set a state in which the function icon KA related to the function deleted from the document camera control toolbox is not displayed without a user's intentional work, and thus convenience for the user is high.

Next, an operation of the projector 100 and the document camera 4 in a case in which the function icon KA included in the document camera control toolbox is operated with the indicator 70 will be described.

Figures 8A, 8B:
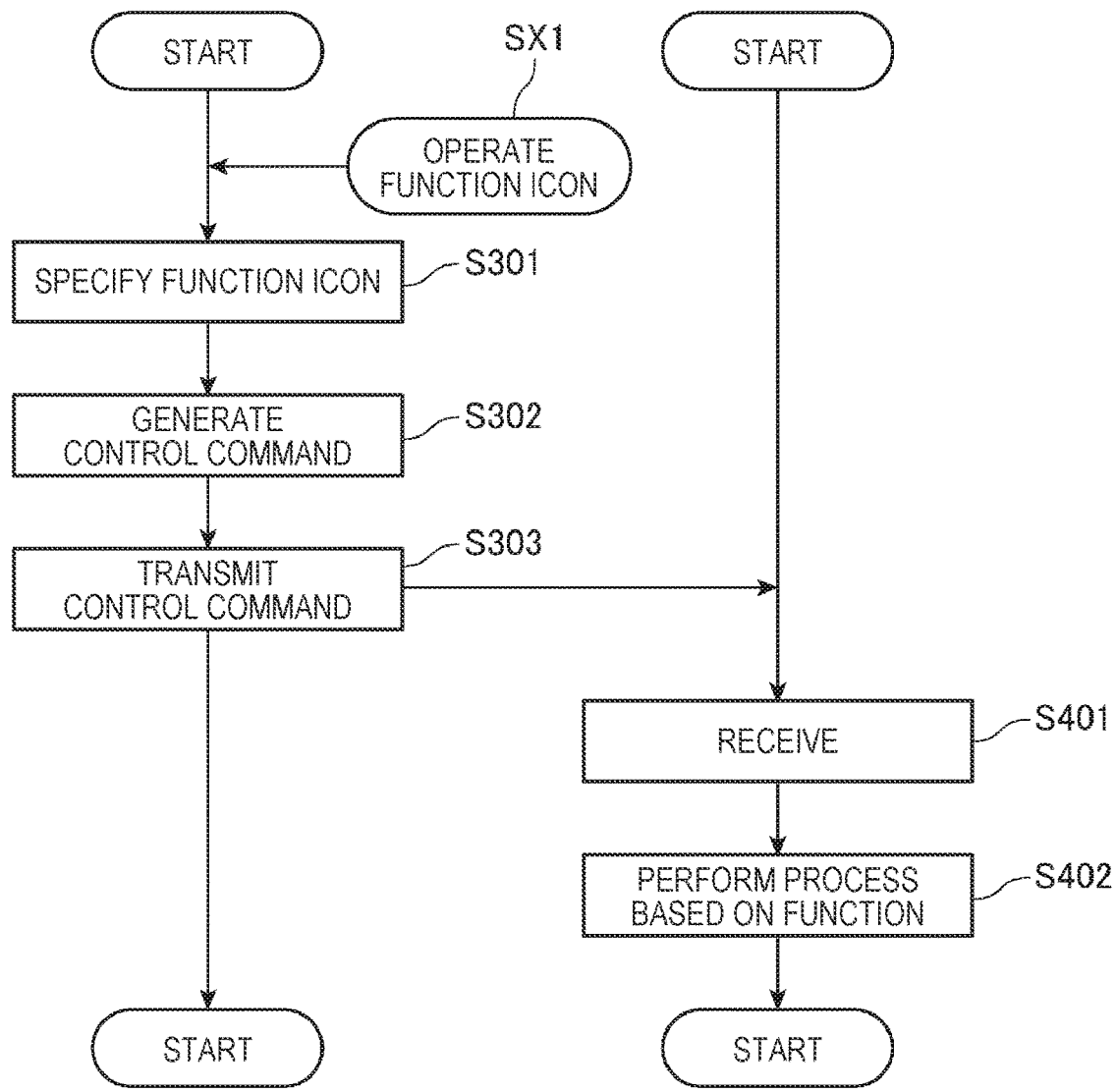
FIGS. 8A and 8B are flowcharts illustrating operations of the projector and the document camera.

FIG. 8 is a flowchart illustrating an operation of the projector 100 and the first document camera 4a in a case in which the function icon KA included in the document camera control toolbox is operated with the indicator 70. FIG. 8(A) illustrates an operation of the projector 100 and FIG. 8(B) illustrates an operation of the first document camera 4a.

In description made using the flowchart of FIG. 8, the following is assumed.

That is, it is assumed that the first USB port P1 is connected to the first document camera 4a, an input of the first USB port P1 is valid, and the first document camera control toolbox TB1 related to the first document camera 4a is displayed on the screen SC.

The user operates any of the function icons KA included in the document camera control toolbox with the indicator 70 (step SX1).

As illustrated in FIG. 8(A), the control unit 30 of the projector 100 specifies the operated function icon KA based on an operation position of the indicator 70 acquired by the operation acquisition unit 32 (step S301).

Subsequently, the instruction information transmission unit 35 of the control unit 30 generates a control command (instruction information) for causing the first document camera 4a to perform the process based on the function corresponding to the function icon KA specified in step S301 (step S302).

For example, in a case in which the operated function icon KA is an icon related to the autofocus function K1, the instruction information transmission unit 35 generates a control command for instructing the first document camera 4a to perform autofocus.

In a control program realizing a function of the instruction information transmission unit 35, an algorithm generating a control command for giving an instruction to perform a process based on a function in regard to each of the functions which the document camera 4 connectable to the projector 100 can have is mounted.

Subsequently, the instruction information transmission unit 35 controls the image I/F unit 12 and transmits the generated control command to the first document camera 4a (step S303).

A region in which the function icon KA operated with the indicator 70 is displayed is equivalent to a "first position" and a process based on a function corresponding to the operated function icon KA is equivalent to a "first process".

As illustrated in FIG. 8(B), the process control unit 414a of the document camera control unit 411a of the first document camera 4a controls the interface unit 412a and receives a control command (step S401).

Subsequently, the process control unit 414a performs a process based on the function corresponding to the operated function icon KA based on the received control command (step S402).

For example, in a case in which the received control command is a control command for giving an instruction to perform the process based on the autofocus function K1, the process control unit 414a performs autofocus.

In this way, in the embodiment, the user can cause the document camera 4 to perform a desired process by performing a simple work of operating the function icon KA included in the document camera control toolbox with the indicator 70 without directly operating the document camera 4. Therefore, in a case in which the display system 1 is used for a presentation and a case in which the presenter considers to cause the document camera 4 to perform a predetermined process, the user can cause the document camera 4 to perform the predetermined process by performing a simple work of operating the function icon KA included in the document camera control toolbox with the indicator 70 without interrupting the presentation, moving to a location of the document camera 4, and without operating the document camera 4.

As described above, the projector 100 (the display apparatus) according to the embodiment includes the image I/F unit 12 (the communication unit) that communicates with the document camera 4, the projection unit 20 (the display unit) that displays an image based on the photographic image data (the image information) received from the document camera 4 via the image I/F unit 12 on the screen SC (the display surface), the position detection unit 50 that detects the position of the indicator 70 with respect to the screen SC, and the instruction information transmission unit 35 that transmits the control command (the instruction information) for causing the document camera 4 to perform the process (the first process) based on the function related to the function icon KA via the image I/F unit 12 in a case in which it is detected that the region (the first position) corresponding to the function icon KA on the screen SC with the indicator 70 is operated based on the detection result of the position detection unit 50.

In this configuration, the user can cause the document camera 4 to perform a desired process with a simple work of operating the function icon KA with the indicator 70 without directly operating the document camera 4.

The projector 100 according to the embodiment further includes the object generation unit 34 that generates the document camera control toolbox (the object). The projection unit 20 displays the document camera control toolbox generated by the object generation unit 34.

In this configuration, the user can cause the document camera 4 to perform the desired process with a simple work of operating the function icon KA included in the toolbox with the indicator 70 using the document camera control toolbox.

In the embodiment, the object generation unit 34 receives the document camera identification information (the first information) from the document camera 4 via the image I/F unit 12 and generates the document camera control toolbox based on the document camera identification information.

In this configuration, the object generation unit 34 can generate the document camera control toolbox corresponding to the document camera 4 based on the document camera identification information.

The projector 100 according to the embodiment includes the storage unit 60 that stores the document camera identification information in association with the object-related information (the information regarding the object). The object generation unit 34 receives the document camera identification information from the document camera 4 via the image I/F unit 12 and generates the document camera control toolbox based on the object-related information stored in association with the document camera identification information in the storage unit 60.

In this configuration, the object generation unit 34 can generate the document camera control toolbox corresponding to the document camera 4 based on the information associating the document camera identification information with the object-related information stored in the storage unit 60.

The projector 100 according to the embodiment includes the first USB port P1 (the first input terminal) and the second USB port P2 (the second input terminal). The object generation unit 34 generates the second document camera control toolbox TB2 based on the document camera identification information received from the second document camera 4b in a case in which the image displayed by the projection unit 20 is switched from an image based on the photographic image data input via the first USB port P1 connected to the first document camera 4a (the first document camera) to an image based on the photographic image data input via the second USB port P2 connected to the second document camera 4b.

In this configuration, according to the switch from the image based on the photographing result of the first document camera 4a to the image based on the photographing result of the second document camera 4b, it is possible to match the document camera control toolbox to the switched image.

In the embodiment, the object generation unit 34 changes a mode of the document camera control toolbox in response to an operation of the indicator 70 corresponding to the edit screen HG (in response to a predetermined operation with the indicator 70).

In this configuration, the user can change the mode of the document camera control toolbox according to a simple method in which the user performs the operation with the indicator 70.

The first document camera 4a according to the embodiment includes the interface unit 412a (the communication processing unit) that communicates with the projector 100, the imaging unit 410a that performs photographing, the image output unit 413a that transmits the photographic image data based on the photographing result of the imaging unit 410a to the projector 100 via the interface unit 412a, and the process control unit 414a that receives the control command generated by the projector 100 based on the operation on the region corresponding to the function icon KA on the screen SC with the indicator 70 via the interface unit 412a and performs the process based on the function related to the operated function icon KA based on the received control command.

In this configuration, the user can cause the document camera 4 to perform a desired process with a simple work of operating the function icon KA with the indicator 70 without directly operating the document camera 4.

The first document camera 4a according to the embodiment includes the determination unit 415a that determines the function (the performable process) and transmits the information indicating the function to the projector 100 via the interface unit 412a.

In this configuration, the document camera 4 can notify the projector 100 of the function of the document camera 4 through the function of the determination unit 415a. The projector 100 can display the document camera control toolbox including the function icon KA corresponding to the function of the document camera 4 based on the notification.

This is the same as the second document camera 4b.

The above-described embodiment and modification examples are merely examples of specific aspects to which the invention is applied and do not limit the invention. The invention can also be applied as other aspects. For example, the indicator used to operate the screen SC is not limited to the pen-type indicator 70. A finger of a user, a laser pointer, an instruction rod, or the like may be used and the shape or size thereof is not limited.

In the foregoing embodiment, the position detection unit 50 causes the photographing unit 51 to photograph the screen SC and specifies the position of the indicator 70, but the invention is not limited thereto. For example, the photographing unit 51 is not limited to the configuration in which the photographing unit 51 is installed in the body of the projector 100 and photographs a projection direction of the projection optical system 23. The photographing unit 51 may be disposed as a separate body from the body of the projector 100 and the photographing unit 51 may perform photographing on a lateral side or a front surface of the screen SC. Further, the plurality of photographing units 51 may be disposed and detect an operation position of the target detection unit 54 based on photographic image data of the plurality of photographing units 51.

In the foregoing embodiment, the configuration has been described in which a synchronization signal is transmitted to the indicator 70 using an infrared signal emitted by the transmission unit 52 from the projector 100 to the indicator 70, but the synchronization signal is not limited to the infrared signal. For example, the synchronization signal may be transmitted through radio wave communication or ultrasonic radio communication.

In the above-described embodiment, the example has been described in which whether the front end portion 71 of the indicator 70 comes into contact with the screen SC is determined based on the lighting pattern of the transceiver unit 74, but the invention is not limited thereto. For example, whether the front end portion 71 of the indicator 70 is pressed against the screen SC may be determined based on an image of the indicator 70 and the front end portion 71 shown in the photographic image data. This configuration can be realized, for example, by detecting an image of the front end portion 71 and an image of the shadow of the indicator 70 from the photographic image data.

In the above-described embodiment, the example has been described in which the operation of the indicator 70 is detected through the function of the position detection unit 50 contained in the projector 100, but the invention is not limited thereto. For example, the function of the position detection unit 50 can also be realized as an apparatus independent from the projector 100. A mode can also be realized in which a display apparatus other than the projector 100 has the function of the position detection unit 50 and operates as a position detection apparatus.

The display apparatus according to the invention is not limited to the projector 100 that projects an image to the screen SC, as described above. Various display apparatuses such as a liquid crystal monitor or a liquid crystal television displaying an image on a liquid crystal display panel, a monitor apparatus or a television receiver displaying an image on a plasma display panel (PDP), and a spontaneous display apparatus such as a monitor apparatus or a television receiver displaying an image on an organic EL display panel called an organic light-emitting diode (OLED) or an organic electro-luminescence (OEL) are included in the display system according to the invention. In this case, the liquid crystal display panel, the plasma display panel, or the organic EL display panel is equivalent to a display unit and a display surface.

In the above-described embodiment, the example has been described in which the three transmissive type liquid crystal panels corresponding to the colors of RGB are used as the light modulation device 22 modulating light emitted by the light source, but the invention is not limited thereto. For example, three reflective liquid crystal panels may be configured to be used or a scheme in which one liquid crystal panel and a color wheel are combined may be used. A scheme in which three digital mirror devices (DMDs) are used or a DMD scheme in which one digital mirror device and a color wheel are combined may be configured. In a case in which only one liquid crystal panel or DMD is used as the light modulation device 22, a member equivalent to a combination optical system such as a cross dichroic prism is not necessary. A light modulation device can also be adopted as well as the liquid crystal panel and the DMD as long as the light modulation device can modulate light emitted by the light source.

The functional blocks illustrated in the functional block diagrams of FIGS. 2 and 3 illustrate functional configurations of the document camera 4 and the projector 100 and specific mounting forms are not limited. That is, it is not necessary to mount hardware corresponding to the functional blocks in the drawings and functions of a plurality of functional units can, of course, also be realized when one processor executes a program. Some of the functions realized by software in the foregoing embodiment may be realized by hardware or some of the functions realized by hardware may be realized by software.

The entire disclosure of Japanese Patent Application No. 2015-068092, filed Mar. 30, 2015 is expressly incorporated by reference herein.

In the flow illustrated in FIG. 4, after the projector 100 receives the document camera identification information from the document camera 4, the record including the document camera identification information acquired in step S103 is specified from the records included in the table with reference to the object-related information table 62 and the object-related information included in the specified record is acquired, but the invention is not limited thereto. For example, without performing steps S102 to S105 and S202, a function information response command including function identification information may be transmitted from the document camera 4 to the projector 100 and the object-related information may be acquired based on the function information response command.

Further, an external apparatus connectable to the projector 100 is not limited to the document camera 4. For example, an apparatus capable of outputting an image or audio, such as a desktop computer, a portable telephone including a smartphone, a video/music player, a tuner apparatus of television broadcast, may be used. A specific configuration of an interface connecting an external apparatus to the projector 100 is not limited. An interface can be applied without limit as long as the interface can transmit an analog image signal, an audio signal, or digital data. In addition, a specific detailed configuration of each of the other units of an apparatus included in the display system 1 can also be changed arbitrarily in the scope of the invention without departing from the gist of the invention.

REFERENCE SIGNS LIST

1 display system
4 document camera
4*a* first document camera (document camera, first document camera)
4*b* second document camera (document camera, second document camera)
12 image I/F unit (communication unit)
34 object generation unit
35 instruction information transmission unit
50 position detection unit
60 storage unit
70 indicator
100 projector (display apparatus)
410*a* imaging unit
410*b* imaging unit
412*a*, 412*b* interface unit (communication processing unit)
413*a*, 413*b* image output unit
414*a*, 414*b* process control unit
415*a*, 415*b* determination unit
TB1 first document camera control toolbox (object)
TB2 second document camera control toolbox (object)
P1 first USB port (first input terminal)
P2 second USB port (second input terminal)
SC display surface

The invention claimed is:
1. A display apparatus comprising:
an interface that communicates with at least one document camera, the at least one document camera being configured to image documents placed on a placement surface;
a projector that displays an image based on image information received from the at least one document camera via the interface on a display surface, the display surface having a position that does not overlap a position of the placement surface of the at least one document camera;
a memory that stores object information in association with an object; and
a processor programmed to:
detect a position of an indicator with respect to the display surface;
detect a communication path being established between the at least one document camera and the display apparatus;
in response to the communication path being established, receive identification information that uniquely identifies each document camera connected to the interface via the communication path;
transmit instruction information causing the at least one document camera to perform a first process via the interface in a case in which a first position of the display surface is operated with the indicator based on the detection result, the first process including:
generating an object to be displayed at the first position based on the object information stored in the memory and the received identification information, the object being a graphical user interface that displays function icons for controlling one or more operations of the at least one document camera; and causing the projector to display the object on the display surface.

2. The display apparatus according to claim 1, further comprising:

a first input terminal and a second input terminal, wherein the processor generates the object based on the first information received from a second document camera in a case in which the image displayed by the projector is switched from an image based on image information input via the first input terminal connected to a first document camera to an image based on image information input via the second input terminal connected to the second document camera.

3. The display apparatus according to claim 1, wherein the processor changes a mode of the object in response to a predetermined operation with the indicator.

4. A method of controlling a display apparatus, the method comprising:

storing, in a memory, object information in association with an object;

displaying, by a projector, an image based on image information received from at least one document camera on a display surface, the at least one document camera being configured to image documents placed on a placement surface having a position that does not overlap a position of the display surface of the projector;

detecting, by a processor, a position of an indicator with respect to the display surface;

detecting, by the processor, a communication path being established between the at least one document camera and the display apparatus;

in response to the communication path being established, receiving, by the processor, identification information that uniquely identifies each document camera connected to the interface via the communication path; and transmitting, by the processor, instruction information causing the at least one document camera to perform a first process in a case in which a first position of the display surface is operated based on the detected position of the indicator, the first process including:

generating an object to be displayed at the first position based on the object information stored in the memory and received the identification information, the object being a graphical user interface that displays function icons for controlling one or more operations of the at least one document camera; and causing the projector to display the object on the display surface.

5. A document camera configured to image documents, the document camera comprising:

an interface that communicates with a display apparatus;
a placement surface having a position that does not overlap a position of a display surface of a projector;
a camera that performs photographing of at least one document placed on the placement surface;
a memory that stores object information in association with an object; and a processor programmed to:

transmit image information based on a photographing result of the camera to the display apparatus via the interface;

detect a communication path being established between the at least one document camera and the display apparatus;

in response to the communication path being established, receive identification information that uniquely identifies each document camera connected to the interface via the communication path; and receive instruction information generated by the display apparatus based on an operation of a first position of a display surface by an indicator via the interface and perform a first process based on the received instruction information, the first process including:

generating an object to be displayed at the first position based on the object information stored in the memory and the received identification information, the object being a graphical user interface that displays function icons for controlling one or more operations of the document camera; and causing the display apparatus to display the object on the display surface.

6. The document camera according to claim 5, wherein the processor is further programmed to:

determine a performable process and transmit information on the determined performable process to the display apparatus via the interface.

7. A method of controlling at least one document camera configured to image documents placed on a placement surface, the method comprising:

storing, in a memory, object information in association with an object;

performing, by the at least one document camera, photographing of the documents placed on the placement surface;

transmitting, by a processor, image information based on a photographing result to a display apparatus displaying an image based on the image information on a display surface, the display surface having a position that does not overlap a position of the placement surface of the at least one document camera;

detecting, by the processor, a communication path being established between the at least one document camera and the display apparatus;

in response to the communication path being established, receiving, by the processor, identification information that uniquely identifies each document camera connected to the interface via the communication path; and receiving, by the processor, instruction information generated by the display apparatus based on an operation on a first position of the display surface by an indicator and performing a first process based on the received instruction information, the first process including:

generating an object to be displayed at the first position based on the object information stored in the memory and the received identification information, the object being a graphical user interface that displays function icons for controlling one or more operations of the at least one document camera; and causing the display apparatus to display the object on the display surface.

\* \* \* \* \*